US005656674A

United States Patent [19]
Holman

[11] Patent Number: 5,656,674
[45] Date of Patent: Aug. 12, 1997

[54] METHOD FOR WORKING UP WASTE MATERIALS

[75] Inventor: Harm Willem Holman, AP Doesburg, Netherlands

[73] Assignee: Terra Ijssel B.V., Lathum, Netherlands

[21] Appl. No.: 248,879

[22] Filed: May 25, 1994

[30] Foreign Application Priority Data

May 28, 1993 [NL] Netherlands ............... 9300919

[51] Int. Cl.$^6$ ................. C08K 11/00; C08J 11/00
[52] U.S. Cl. ................. 521/40; 521/41; 524/13; 524/14; 524/16; 524/34; 524/35; 523/129
[58] Field of Search ................. 521/40; 524/9, 524/10, 11, 12, 13, 14, 15, 16; 523/129

[56] References Cited

U.S. PATENT DOCUMENTS

| | | | |
|---|---|---|---|
| 3,278,662 | 10/1966 | Mangrum | 264/77 |
| 3,443,347 | 5/1969 | Varnell et al. | 52/82 |
| 3,852,232 | 12/1974 | Bowman et al. | 524/14 |
| 3,965,051 | 6/1976 | Markusch et al. | 260/37 N |
| 4,013,616 | 3/1977 | Wallace | 260/2.3 |
| 4,021,401 | 5/1977 | Jeppsen | 260/37 N |
| 4,070,311 | 1/1978 | Cominassi et al. | 524/13 |
| 4,279,790 | 7/1981 | Nakajima | 260/17.4 |
| 4,541,843 | 9/1985 | Elbel et al. | 52/298 |
| 4,567,215 | 1/1986 | Jackson | 524/14 |
| 5,001,190 | 3/1991 | Carpenter et al. | 524/871 |
| 5,030,662 | 7/1991 | Benerjie | 521/43.5 |
| 5,155,147 | 10/1992 | Dietz et al. | 524/9 |
| 5,194,461 | 3/1993 | Bergquist et al. | 524/16 |
| 5,272,190 | 12/1993 | Kai et al. | 524/11 |
| 5,312,858 | 5/1994 | Folsom | 524/11 |

FOREIGN PATENT DOCUMENTS

| | | |
|---|---|---|
| 0 091 529 | 10/1983 | European Pat. Off. . |
| 0 466 250 | 1/1992 | European Pat. Off. . |
| 24 02 976 | 7/1975 | Germany . |
| 31 20 831 | 12/1982 | Germany . |
| 32 43 361 | 5/1984 | Germany . |
| 2 231 881 | 11/1990 | United Kingdom . |

OTHER PUBLICATIONS

Database WPI, Week 8617, AN 86–110262, JP-A-61 053 138, 17 Mar. 1986.
Database WPI, Week 9012, AN 90–087230, JP-A-2 040 277, 9 Feb. 1990.

*Primary Examiner*—Joseph L. Schofer
*Assistant Examiner*—Olga Asinovsky
*Attorney, Agent, or Firm*—Larson & Taylor

[57] ABSTRACT

The invention manufactures mechanical strong objects from a mixture of a plurality of fractions, which together have a high filling grade by accommodating them in plastic, preferably a thermosetter of the low viscosity type. The plastic is preferably resistant against leaching as defined in the Concept Bouwstoffenbesluit, when pollutions in the fractions are present. Finally the invention gives objects with good mechanical properties at low cost price, because of the relatively small use of plastic (to only 8 volume % or less) and the favorable mechanical properties of strongly densified waste, residual or filler materials. Coloring of the objects is possible and the surface can be very smooth. Fibres or residues of fibres containing waste materials can improve the obtained products still further.

17 Claims, No Drawings

METHOD FOR WORKING UP WASTE MATERIALS

The invention relates to a method for working up of waste materials and structural parts obtained therewith.

The term waste material in fact indicates an in itself undesired product that has no direct useful application. Once such an application has been found the same material can be called a raw material.

In practice, by waste material is meant a material, which in its present state has no useful application and/or requires additional payment, sometimes in the form of transport free of charge, when being transferred. Examples of such waste materials are debris and materials derived therefrom such as refract sand, demolish sand and wash silt; glass; used plastic material that is not, or only after labour intensive selection, suitable to be used; fibres of natural or artificial materials and even of asbestos, moulding sand; silt or sludge, such as paper sludge, sludge from purification of waste water or preparation of drinking-water and used steal grit, often together with the material removed by grit blasting that for example may contain dyeing materials.

The working up of such waste materials, such as demolition debris in practice often leads to difficulties, especially of certain components can be worked up and others not. Moreover many waste materials in principal have a good mechanical quality and therefore can be used for technically and economically highly valuable structural parts. Herewith it is pointed to it that waste material of have a negative "buying price".

A further difficulty with working up of waste materials is, that they often contain demolitions, which on base of the Concept Bouwstoffenbesluit (Dutch environmental rules with respect to secondary building materials) prevent allowance to bring them in immediate contact with soil or use them as materials.

When working up demolition debris it is often allowed to use important quantities thereof in contact with the soil and/or ground water. These are the so-called residual materials, to which the Law about waste materials does not apply. However, there may be demolition debris, fractions of which contain so much pollution that for instance for dumping expensive precautions are necessary to counter leaching of the pollutions. Such fractions, possibly coming from or existing in polluted materials, as for instance occur in chimneys, in the following will be called residues of waste materials. Further in the invention so-called filler materials may find application, which consist in unpolluted materials, not being residual materials, as for example sand.

Further it is possible to use fibres or fibres containing materials as substances to be disposed of. When manufacturing fibre-reinforced materials, such as heat or sound insulation plates, often edges have to be cut off. Those edge strips and the plates themselves after use or if they have to be destroyed for other reasons, can be worked up in accordance with the invention. If the plate debris are sufficiently crushed, the fibres will seldom be cut and, therefore, will on the average keep the same length, but any binding material will be broken into small particles. If such a material is used in accordance with the invention, possibly together with other waste materials, objects may be obtained in which the fibres, even asbestos or glass fibres, cannot do any harm.

The invention aims at providing a method for working up of waste materials, residual materials and/or filler materials, which enables to obtain in a relatively cheap way structural parts of high quality, good outlook and dyeable at will, whereas the mechanical properties are good to very good. Herewith is meant, that a high compression strength is obtained and a tensile strength, which is by far superior to that of for instance unarmed concrete.

According to the invention the above aims are obtained in that fractions of waste residual and filler materials of different particle sizes are accommodated in plastic in such proportions, that a high filling grade is obtained.

In this specification by plastics materials are understood, which consist in polymers or co-polymers, however, may be at least partially of natural origin, such as rubber or latex and which may be, thermoplastic as well as thermocuring materials or thermosetters.

An additional advantage of the invention is, that obtained objects can be very tightly bounded to other objects or layers, for instance layers with information on a road surface by choosing a substance adhering to the used plastic or the used plastic itself.

Herewith it is especially important, that a greater strength can be combined with a lower cost price, because for an object of a predetermined volume a smaller quantity of plastic is necessary. Therewith can be pointed to it, that, for instance for preparing concrete, it is known per se to mix fractions of different particle sizes. However, with preparing concrete the finest fraction is sand, whereas it has appeared, that a higher total density of the filler materials can, be obtained if the finest component is considerably finer, for instance is formed by silt.

When the invention it is without more possible to obtain a filling grade of more than 80 volume %, which means, that the plastic forms at most 20 volume %. When using for instance a relatively large number of fraction of 7 to 10, it is possible to attain a filling grade of more than 92 volume %, for instance 95 volume %, a percentage of 92 volume % being possible without more with normal production conditions.

Therewith a smooth, well finished surface of the whole of the waste, residueal filler materials and plastic can be obtained, for instance by providing in a way known per se the plastic with dyeing materials and/of manufacturing the objects in a mould, which at its inner walls has been provided with discharge enhancing agents.

Especially good results have been obtained with the invention if the maximal particle size of the finest fraction is 0.05 to 0.15 mm. The minimal particle size may be in the order of 1 μ. Preferably at least 1–5 volume % of the particles have a particle size of 2 μ or less.

The particle size of the coarsest fraction theoretically will have to be as large as possible as an object to be formed allows. However, it has appeared, that compositions with large lumps, for instance of a few centimeter, also when the different fractions are composed according to the Fuller curve, take more plastic than with smaller dimensions of the largest particles. The reason hereof is not completely known, but a possible and even probable explanation is, that larger lumps normally break at breaches already present, so that a part of the interstitial volume comes at the outer side. If the lumps are not yet broken brick and mostly also concrete have a non neglectable pores volume, which can receive plastic without improving the mechanical properties of the whole.

A favourable composition, which may lead to a high filling grade consists in that the finest fraction forms 10–20 volume % related to the total volume of the waste, residual and filler materials and has a maximal particle size of 0.05–0.15 mm, that the finest fraction but one has a particle size of 0.10–0.40 mm and forms 5–15 volume % of the waste, residual and filler materials, that the finest fraction but two has a particle size of 0.20–1.5 mm and forms 20–35 volume % of the waste, residual and filler materials and that the coarsest fraction has a particle size of 0.7–5 mm and forms 40–60 volume % of the waste, residual and filler materials.

More especially therewith it can be provided that the first fraction has a particle size of 0.001–0.1 mm and forms 16 volume % of the total volume of the waste, residual and filler materials, that the second fraction has a particle size of 0,1–0,2,5 mm and forms 9 volume % of the waste, residual and filler materials, that the third fraction has a particle size of 0,25–1,0 mm and forms 25 volume % of the waste, residual and filler materials and that the fourth fraction has a particle size of 1,0–4,0 mm and forms 50 volume % of the waste, residual and filler materials.

This complies completely with the theory of the Fuller formula, which is:

$S = 100\sqrt{d/D}$ with $S$=volume percent of each fraction;
$d$=maximal particle size of each fraction;
$D$=the maximal particle size used.

Available waste and filler materials:
1. Particle size 0,0–0,1 mm.
2. Particle size 0,1–0,25 mm.
3. Particle size 0,25–1,0 mm.
4. Particle size 1,0–4,0 mm.

This leads to the following fractions:
1. Particle size 0,0–0,1 mm: $100\sqrt{(0,1)}:4=16\%$
2. Particle size 0,0–0,25 mm: $100\sqrt{(0,25)}:4=25\%$
3. Particle size 0,0–1,0 mm: $100\sqrt{(1,0)}:4=50\%$
4. Particle size 0,0–4,0 mm: $100\sqrt{(4,0)}:4=100\%$ From these numbers the volume % of finer fractions has to be subtracted, so that

| | | |
|---|---|---|
| 1. | 16 – 0 = | 16% |
| 2. | 25 – 16 = | 9% |
| 3. | 50 – 25 = | 25% |
| 4. | 100 – 50 = | 50% |
| | | 100% |

According to a further elaboration of the invention it is provided with accommodating waste and/or filler materials in an object with a predetermined smallest dimension that the largest particles have a size of 0,25–0,35 mm of this smallest dimension. Generally this smallest dimension will be the thickness, for instance of tile or building brick. Of course such an object needs not to be a parallelepipedum, for instance if it concerns six sided tiles or elements.

As things look nowadays the invention has its greatest utility with waste and residues from demolition activities, in which case a plurality of special advantages are obtained. In the first place, when using the invention, no residues need to be dumped. This generally means an important safe of dumping taxes and transportation costs and increases the surveyability of the branch for working up waste.

A further advantage is, that building elements or building materials can be obtained, which possess a high resistance against the weather, attractive outlook, high mechanical strength and a relatively low cost price. An importance additional advantage is, that silt, for instance silt of sludge of effluent purification plants, which often contains a high content of heavy metals, can be accommodated in a useful building element, wherewith leach can be prevented by a suitable choice of the plastic.

Accordingly a further elaboration of the invention provides that silt, which is derived from effluent purification, possibly after drying or burning, is used as finest fraction.

Preferably the plastic is an artificial resin, to which a setting agent and an accelerator have been added, such that the resin remains in liquid condition during a sufficient time period to form together with the filler material a sufficiently porous free object, whereas at the other hand in relatively short time sufficient mechanical strength is obtained to allow handling of the objects. An advantage of the invention is, that a high contents of filler material, which with setting of the resin have also to be heated, causes the temperature rise to be limited. When using the invention it is possible to use a water free resin or a water containing resin. The latter has the advantage, that also the waste or filler materials need not to be dried.

It has appeared that completely wetting of the waste and/or filler materials and filling up of the pores with plastic can be attained by using plastic of low viscosity type and vibrate it together with the waste and/or filler materials. Therewith it has been appeared, that in relatively short time a very dense packing of the solid particles has been obtained with a complete wetting. Because in practice the artificial resin is lighter than the debris particles and such like the resin drifts toward the surface.

An improvement of the vibrating mechanism, which by the way is known per se in manufacturing concrete can be obtained by providing according to a further elaboration of the invention, that the non-set artificial resin is thixotropic. By reason hereof the viscosity in still-standing parts of the liquid is relatively high, so that the plastic material shows little tendency to penetrate the pores, but between the different particle, which carry out different movements thixotropy causes the viscosity to be very low, which enhances the whole process.

When according to the invention waste and/or filler materials are accommodated in artificial resin preferably one manufactures objects of a predetermined shape by letting the setting of the plastic material occur in a mould. Therewith it has appeared that the whole, in a way known per se, can be dyed, as a result of which an attractive outlook can be obtained. Moreover, it is possible to obtain objects with smoothly finished surface in a way known per se to provide the inner walls of the mould with a discharge agent.

The objects obtained with the invention generally are suitable to be accepted as building materials, also if they contact the soil. Most of the waste and filler materials will not be polluted so that the obtained objects can comply easily with the Concept Bouwstoffenbesluit. An important advantage of the invention is, however, that demolishing fractions, which are polluted, can be accommodated in a non-leaching plastic and that they also can be used with application of the invention as fraction or a part of a fraction, provided the eventual result can comply with the exigences with respect to leaching.

It has appeared that the invention can be carried out with existing resins and yield a completely satisfactory result. Further it has appeared that certain auxiliary materials which are in a moderate scale available in commerce in certain cases may give better results with respect to wetting, filling up of pores and countering leaching. Therewith one should preferably strive for the particles being enclosed in such away with such a resin, that leaching of heavy metals and polycyclic aromatic hydrocarbons will not occur in acid environments as well as in basic environments.

One of the important tests is to expose an object obtained with the invention during 64 days to aqua regia, a mixture of concentrated nitric acid and hydrochloric acid. The object is submitted to a leach test and it is determined whether pollution materials such as heavy metals leach from the object. In contradistinction of any type of concrete applicant knows of, no leaching of any type or, strength has been determined. Of course, the plastic used has to be resistant to acid (and also to alkaline) environments, which, as practice has shown, can easily be found.

Though the invention may be applied with thermoplastics as well as thermosetters, the latter are preferred because of their better mechanical properties. Further unsaturated resin is preferred above epoxy resin, whereas melamine formaldehyde gives, it is true, favourable results, but for reasons of cost price preferably is only used for the outer layer. Polyurethane, though mechanical not undesirable, has the disadvantage that, especially with incomplete setting, the possibility exists of emissions of substances which are poisonous for human beings.

With the invention generally the possibility of re-use will play no part or only a very little one, but if re-use is desired thermoplasts have considerable advantages over thermosetters.

For dyeing the objects to be obtained in principle use can be made of known dyeing materials and pigments. Preferably a strongly covering pigment is used, unless for some reason the particle structure has to be visible.

With the invention the quantity of needed plastic is extremely low, especially if a very fine finest fraction is used. Moreover is the absorption of plastic in the coarsest fraction small, if that fraction does not contain too large lumps.

To determine whether a plastic is suitable for application with strongly leaching waste materials one can make a sample, which can be subjected to leaching tests according to the Concept Bouwstoffenbesluit. When polluted and not polluted waste materials are worked up only for objects in which much polluted material is present a leach resistent plastic has to be chosen.

From a view point of costs the invention appears to be very attractive, because of the low content of plastic and the possibility to work up residues from demolishing debris completely, especially because it has appeared that the compressive strength as well as the tension strength are favourable with products manufactured according to the invention.

The following values were measured with blocks of 100 mm×100 mm×400 mm made according to the invention:

| Density | NEN 5967 | 1990 kg/m$^3$ |
|---|---|---|
| Bending strength | NEN 7014 | 15,9 N/mm$^2$ |
| Compressive strength | NEN 5968 | 109,4 N/mm$^2$ |
| Tensile strength | NEN 5969 | 9,75 N/mm$^2$. |

From these measurements follows in comparison to the most current class B 35 of concrete an improvement of 3 times for the compressive strength and 15 times for the bending strength.

Herefrom it may be concluded, that a product made according to the invention generally will not need a reinforcement.

This is still more valid for objects in which fibres have been used. These fibres can come from fibre containing waste materials which are crushed in such a way, that the fibres are mainly free of binding materials, such as cement. An important increase of the tension strength is especially possible with fibres of a length of 2 cm or more.

Objects made by applying the invention may be of any type such as poles, piles, tiles, roofing tiles, bricks and so on.

I claim:

1. Method for working up solid waste into a product, comprising the step of incorporating pollutant-containing fractions of waste materials of different particle sizes in a plastic material which substantially prevents leaching of the pollutant contained in said waste material from the product when the product is exposed to the environment, in such proportions, that a filling grade of at least 88 volume percent in the product, the rest being plastic, is obtained, and wherein the finest fraction of the waste material has a maximum particle size of 0.05–0.15 mm and comprises 10–20 volume percent, related to the total volume of said waste material, the second finest fraction has a particle size of 0.10–0.40 mm and comprises 5–15 volume percent, related to the total volume of said waste material, the second coarsest fraction has a particle size of 0.20–1.5 mm and comprises 20–35 volume percent, related to the total volume of said waste material, and the coarsest fraction has a particle size of 0.7–5 mm and comprises 40–60 volume percent of the waste material.

2. Method according to claim 1, wherein the filling grade is 92 volume % or more.

3. Method according to claim 1, wherein the maximum particle size of the finest fraction is 0.05 to 0.15 mm and the minimum particle size is of the order of 1 micron.

4. Method according to claim 3, wherein at least 1–5 volume % of the particles have a particle size of 2 μ or less.

5. Method according to claim 1, wherein the maximal size of the coarsest fraction is less than 10 mm, preferably less than 5 mm.

6. Method according to claim 1, wherein the first fraction has a particle size of 0.001–0.1 mm and forms 16 volume % of the total volume of the waste materials, that the second fraction has a particle size of 0.1–0.25 mm and forms 9 volume % of the waste materials, that the third fraction has a particle size of 0.25–1.0 mm and forms 25 volume % of the waste materials and that the fourth fraction has a particle size of 1.0–4.0 mm and forms 50 volume % of the waste materials.

7. Method according to claim 1 for accommodating particles of waste materials in an object with a predetermined smallest dimension, wherein the largest particles have a size of 0.25–0.35 of this smallest dimension.

8. Method according to claim 1, wherein the waste materials contain remainders of demolition debris of buildings and/or hydraulic engineering or road construction artifacts in the shape of broken brick or concrete, demolition sand and/or break sand.

9. Method according to claim 8, wherein silt, such as debris washing silt or silt of waste water purification, possibly after drying or burning is added as finest fraction.

10. Method according to claim 1, wherein the waste materials contain fibres or remainders of crushed fibres containing materials.

11. Method according to claim 1, wherein the at least one resin is an artificial resin.

12. Method according to claim 1, wherein the at least one resin has a low viscosity and is vibrated together with at least one material selected from waste materials.

13. Method according to claim 12, wherein the at least one resin comprises at least one thermoplastic or thermosetting.

14. Method according to claim 1 for manufacturing a structural part which comprises remainders of waste materials accommodated in plastic in a mould.

15. Method for demolishing a building and working up the demolition debris, comprising the steps of demolishing the building and employing a fraction which is too polluted to be allowed to be dumped, in the method according to claim 1.

16. The product produced by the method according to claim 1.

17. Method according to claim 13, wherein the at least one thermoplastic or thermosetting resin is thixotropic.

* * * * *